(12) United States Patent
Chen

(10) Patent No.: US 6,411,823 B1
(45) Date of Patent: *Jun. 25, 2002

(54) REPLACEABLE SIGNAL CABLE MAKING A SOUND-CONTROLLED OR EXTERNALLY DIALED HAND-FREE SYSTEM UNIVERSALLY COMPATIBLE WITH ALL TYPES OF CELLULAR PHONES

(75) Inventor: Tonny Chen, Chang-Hua (TW)

(73) Assignee: E. Lead Electronic Co., Ltd., Chang-Hua (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,863

(22) Filed: Mar. 8, 1999

(51) Int. Cl.$^7$ ................................. H04B 1/38
(52) U.S. Cl. ................ 455/559; 455/569; 455/564; 455/346
(58) Field of Search .................. 455/557, 559, 455/569, 550, 575, 90, 564, 565, 566, 570, 573, 345, 346, 347, 348, 349; 439/620, 669

(56) References Cited

U.S. PATENT DOCUMENTS

| | | | | |
|---|---|---|---|---|
| 5,038,400 A | * | 8/1991 | Baracat et al. | 455/90 |
| 5,333,177 A | * | 7/1994 | Braitberg et al. | 455/559 |
| 5,774,793 A | * | 6/1998 | Cooper et al. | 455/566 |
| 6,041,243 A | * | 3/2000 | Davidson et al. | 455/557 |
| 6,075,999 A | * | 6/2000 | Vilmi et al. | 455/557 |
| 6,179,666 B1 | * | 1/2001 | Osborn | 439/669 |

* cited by examiner

Primary Examiner—Lester G. Kincaid
(74) Attorney, Agent, or Firm—Rosenberg, Klein & Lee

(57) ABSTRACT

A replaceable signal cable for connection of a specific type of cellular phone to a sound controlled or externally dialed hand-free system enables the hand-free system to be adapted for universal use on all types of cellular phones by simple selection of a proper signal cable in use. In other words, it relates more particularly to a signal cable for a hand-free system, which can be selectively replaced with ease so as to make all types of cellular phones universally adapted to one single hand-free system. The signal cable is equipped with a first connecting plug coupled with a cellular phone and a second connecting plug connected to a hand-free system. A dial-decoding IC or circuitry housed in either the first connecting plug for a cellular phone or the second connecting plug for a hand-free system is adopted according to codes set by a standard communication protocol for each type of cellular phone. So, simple replacement of a signal cable permits a hand-free system to be universally applicable to all kinds of cellular phones.

9 Claims, 8 Drawing Sheets

REPLACEABLE SIGNAL CABLE MAKING A SOUND-CONTROLLED OR EXTERNALLY DIALED HAND-FREE SYSTEM UNIVERSALLY COMPATIBLE WITH ALL TYPES OF CELLULAR PHONES

BACKGROUND OF THE INVENTION

The present invention relates to a replaceable signal cable for connection of a specific type of cellular phone to a sound controlled or externally dialed hand-free system. It enables the hand-free system to be adapted for universal use on all types of cellular phones by simple selection of a proper signal cable in use. In other words, it relates more particularly to a signal cable for a hand-free system, which can be selectively replaced with ease so as to make all types of cellular phones universally adapted to one single hand-free system. The signal cable is equipped with a first connecting plug coupled with a cellular phone and a second connecting plug connected to a hand-free system. A dial-decoding IC or circuitry housed in either the first connecting plug for a cellular phone or the second connecting plug for a hand-free system is adopted according to codes set by a standard communication protocol for each type of cellular phone. So, simple replacement of a signal cable permits a hand-free system to be universally applicable to all kinds of cellular phones.

Usually a signal cable is adapted for use between a sound-controlled or externally dialed hand-free system and a particular type of cellular phone operated on codes defined by a specific communication protocol for cellular phones. To make a sound-controlled or externally dialed hand-free system compatible with a cellular phone, communication codes transmitted from the cellular phone must be decoded with success by the hand-free system. To permit a sound-controlled or externally dialed hand-free system to be universally adapted for all types of cellular phones operated on different code protocols, a replaceable signal cable which is adapted for one specific type of cellular phone is developed. Such a signal cable must be selectively substituted with ease so as to make a sound-controlled or externally dialed hand-free system universally compatible with all types of cellular phones.

Cellular phones have been widely used by people all over the world, and in modern big cities, a very high percentage of people carry a cellular phone all around. Multiple types of cellular phones provided with various functions have been marketed at an astounding speed, and their related peripheral equipment is also developed at the same pace and sold on markets everywhere. Hand-free system for use in a vehicle is the hottest commercial item in recent years. It is widely accepted by consumers as a result of consideration of driving safety and convenience of use in practical operation of a cellular phone in a moving vehicle. The phenomena is described in a term of "communication on move" by people. This hand-free system is not ideal enough to make driving that safe when operating a cellular phone in spite of its facility brought to drivers. There are still hidden hazards in driving when using a cellular phone, especially dialing a cellular phone in driving. To solve such a problem, a sound-controlled dial system or a dial keyboard mounted to a steering wheel for dialing purpose is developed. However, the conventional sound-controlled or externally dialed hand-free system has the following disadvantages in practical use.

1. Different types of cellular phones, or cellular phones produced by various makers adopt codes defined by different communication protocols, i.e., the dialing codes associated with the dial keyboards for 0, 1, 2, . . . 9, SEND, END and etc. are varied from one cellular phone to another. So, makers must produce one particular sound-controlled or externally dialed hand-free system for each type of cellular phone individually. This makes production cost high and stock house full of various kinds of hand-free systems.

2. One family may have more than one cellular phone among its members, more than one type of hand-free systems must be purchased. When a cellular phone is traded for a new one, a new hand-free system must be set again, thus making unnecessary waste of money.

3. Vehicles designed with the idea of "communication on move", a hand-free system is inevitably installed in the vehicles as a standard facility and operates in combination with a vehicle's audio stereo system. So, if the problem of compatibility of a hand-free system with a cellular phone can not be tackled, i.e., a driver's cellular phone is not compatible with a vehicle's hand-free system, he or she is not able to benefit from the convenience of such an equipment.

The inventor noticing this disadvantage of a conventional sound-controlled or externally dialed hand-free system came up with a signal cable having a dial-decoding IC or circuitry integrally housed therein for each individual cellular phone in combination with a sound-controlled or externally dialed hand-free system. Thereby simple replacement of signal cables permits the sound-controlled or externally dialed hand-free system to be universally adapted for all types of cellular phones.

SUMMARY OF THE INVENTION

Therefore, the primary object of the present invention is to provide an replaceable signal cable each having a specific dial-decoding IC or circuitry integrally housed therein, in combination with a sound-controlled or externally dialed hand-free system. Each signal cable is adapted for each type of cellular phone whereby simple selection of a proper signal cable for each type of cellular phone which is operated on codes set according to different international communication protocols for cellular phones. Thus, making a hand-free system universally adapted for all types of cellular phones becomes possible.

DETAILED DESCRIPTION OF THE PREFERRED EMBODIMENTS

Figure 1:
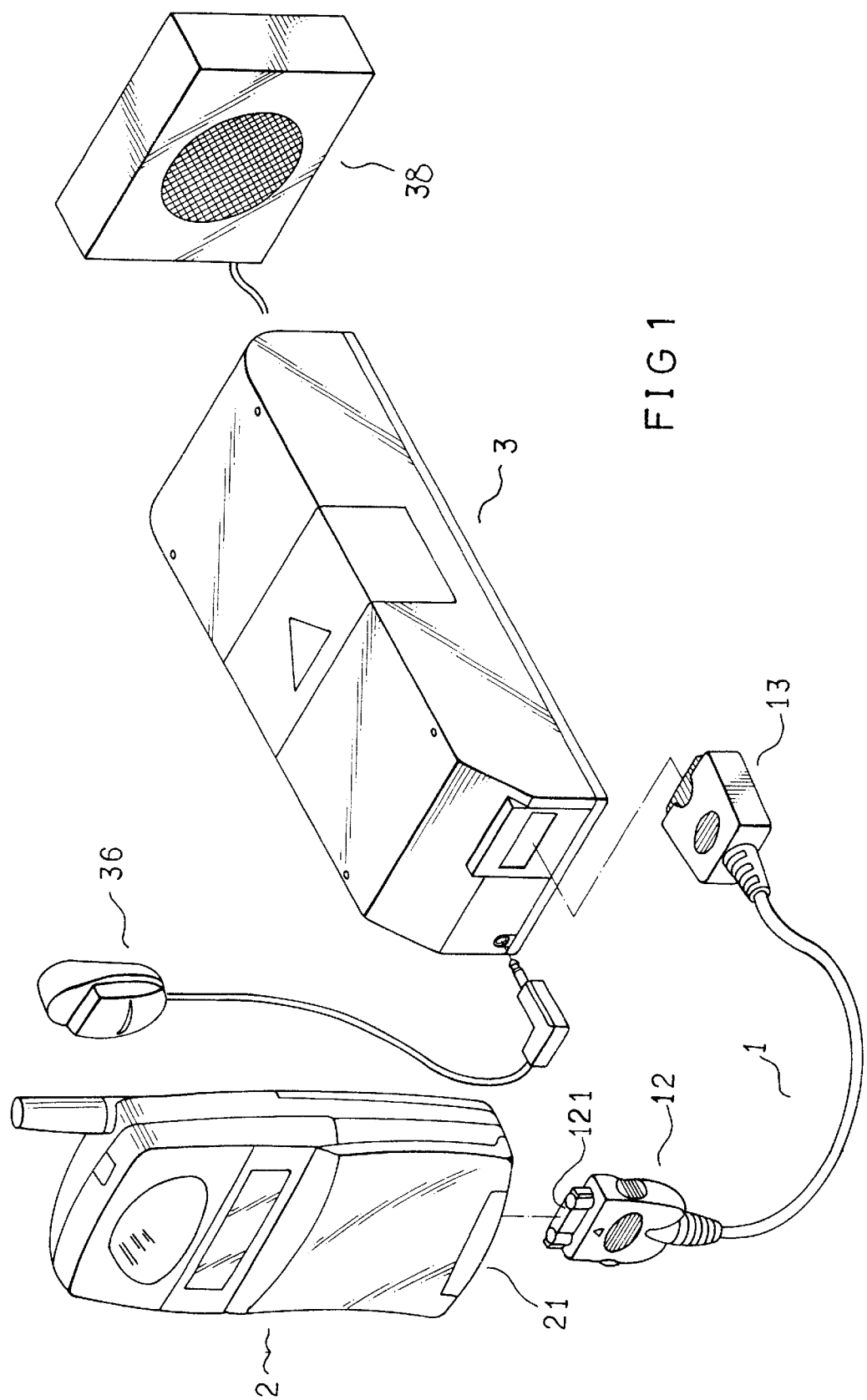
FIG. 1 is a diagram showing the present invention in combination with a sound controlled hand-free system.
Figure 2:
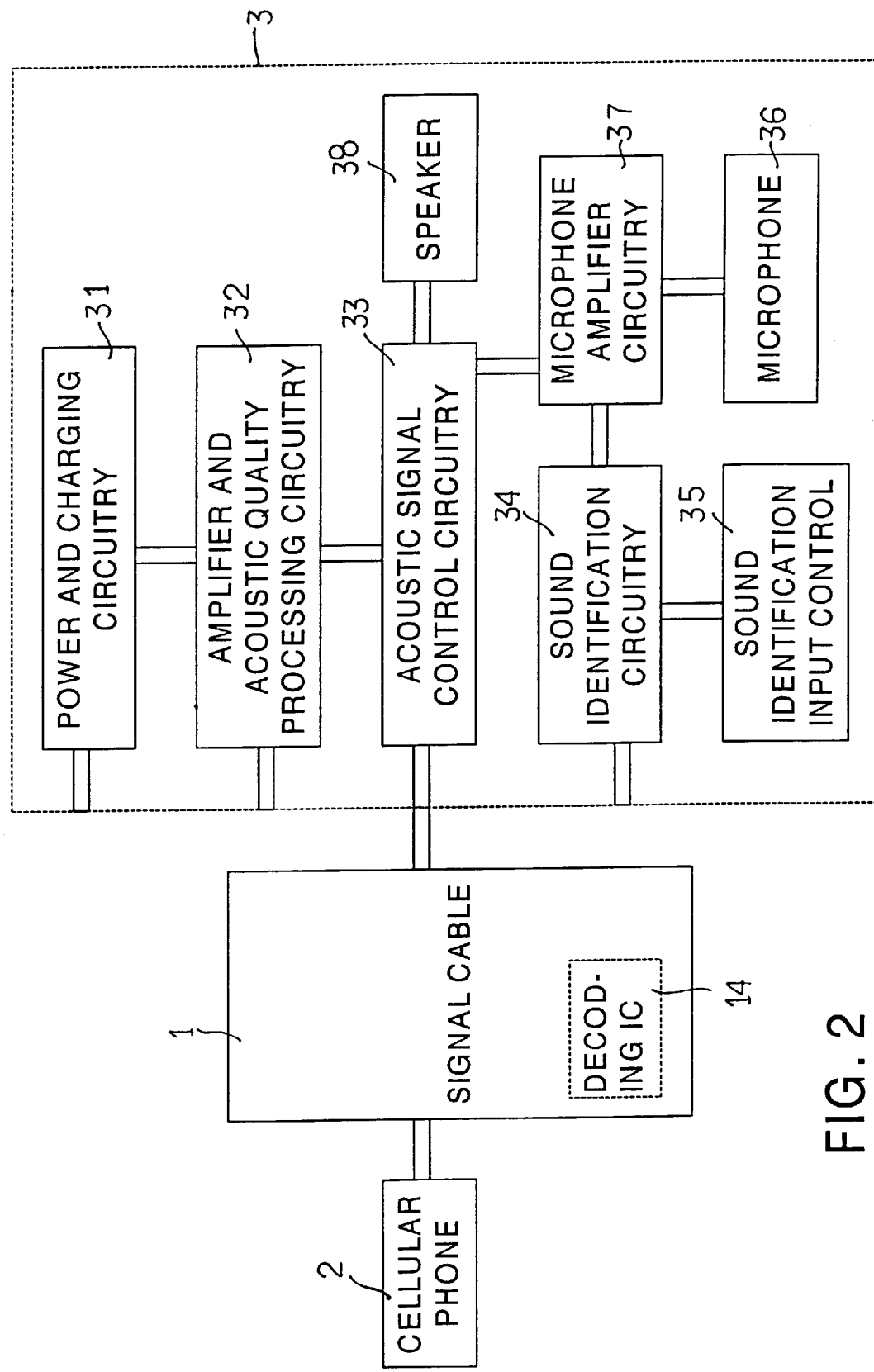
FIG. 2 is a block diagram showing the operational connection of the present invention to a sound controlled hand-free system.
Figure 3:
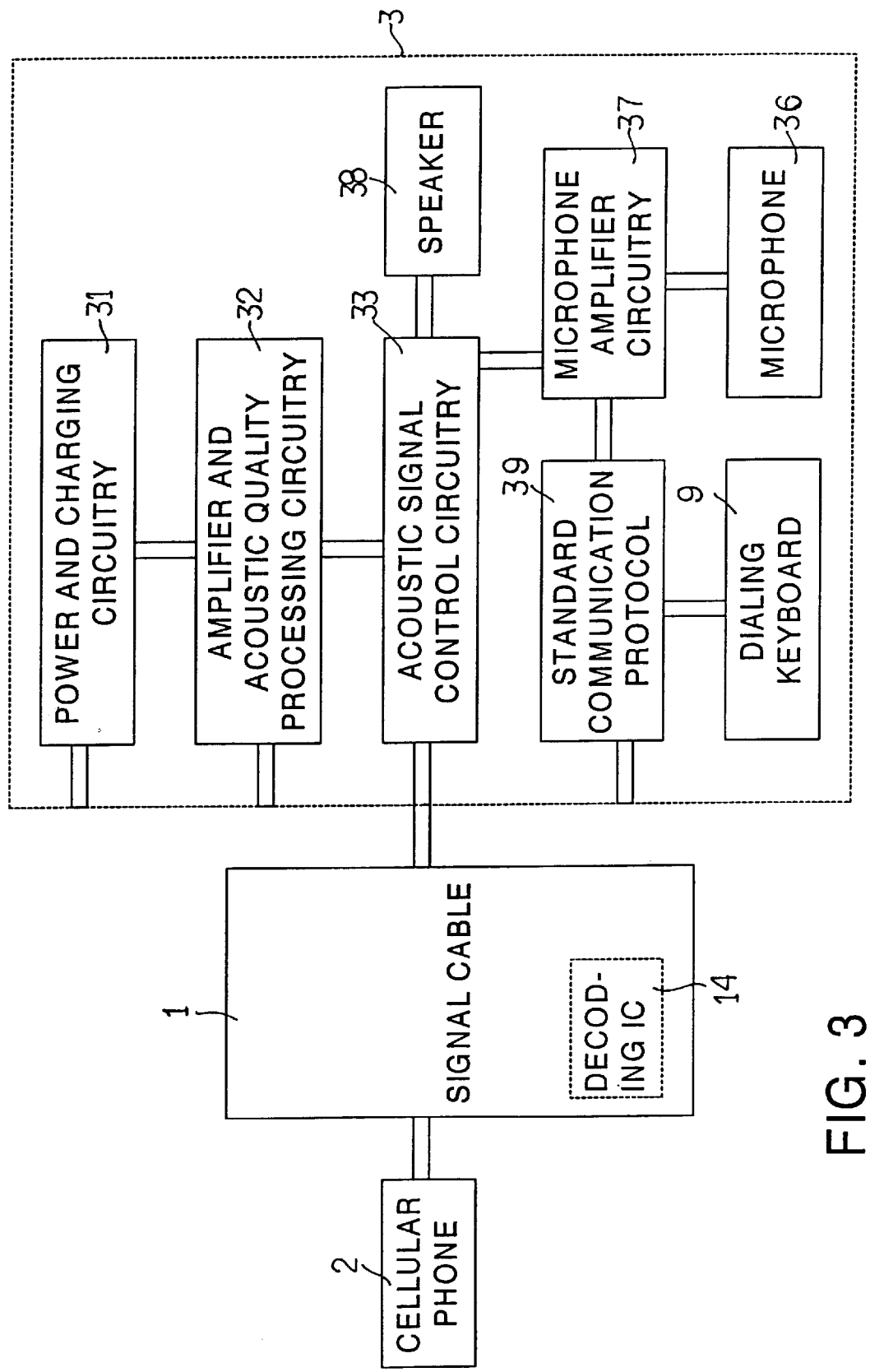
FIG. 3 is a block diagram showing the present invention in combination with an external dialing means.

Referring to FIGS. 1, 2 and 3, it shows the signal cable 1 of the present invention is used in combination with a sound controlled or external dialing hand-free system 3. The signal cable 1 has a flexible cord 11 equipped with at one end a first connecting plug 12 defined in conformance to an signal output socket 21 of a cellular phone 2. The signal cable 1 is also provided with at an opposite end thereof a second connecting plug 13 in registration with a socket of a hand-free system 3. The first connecting plug 12 has coupling pins 121 in correspondence to the output points of the signal output socket 21.

Figure 5:
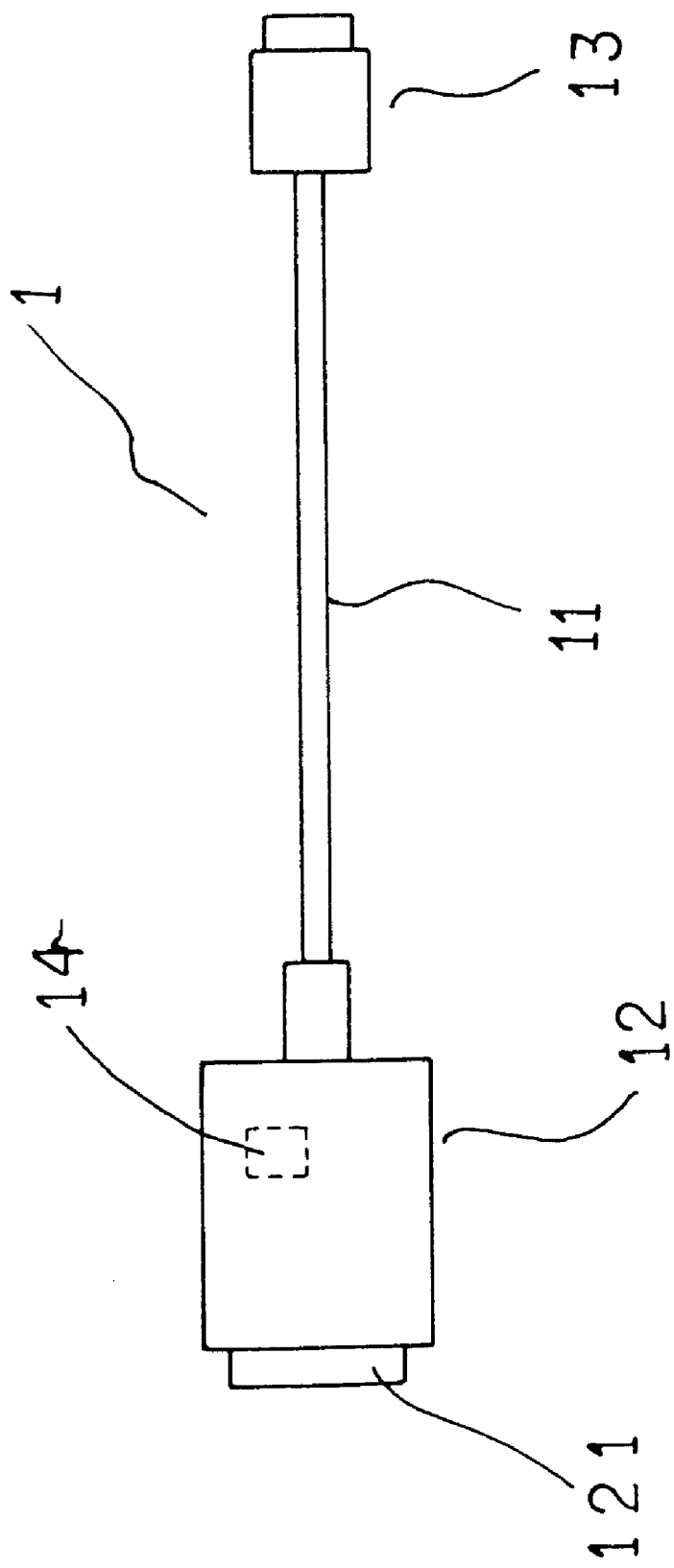
FIG. 5 shows one connecting plug of the signal cable of the present invention internally equipped with a dial-decoding IC or circuitry.
Figure 6:
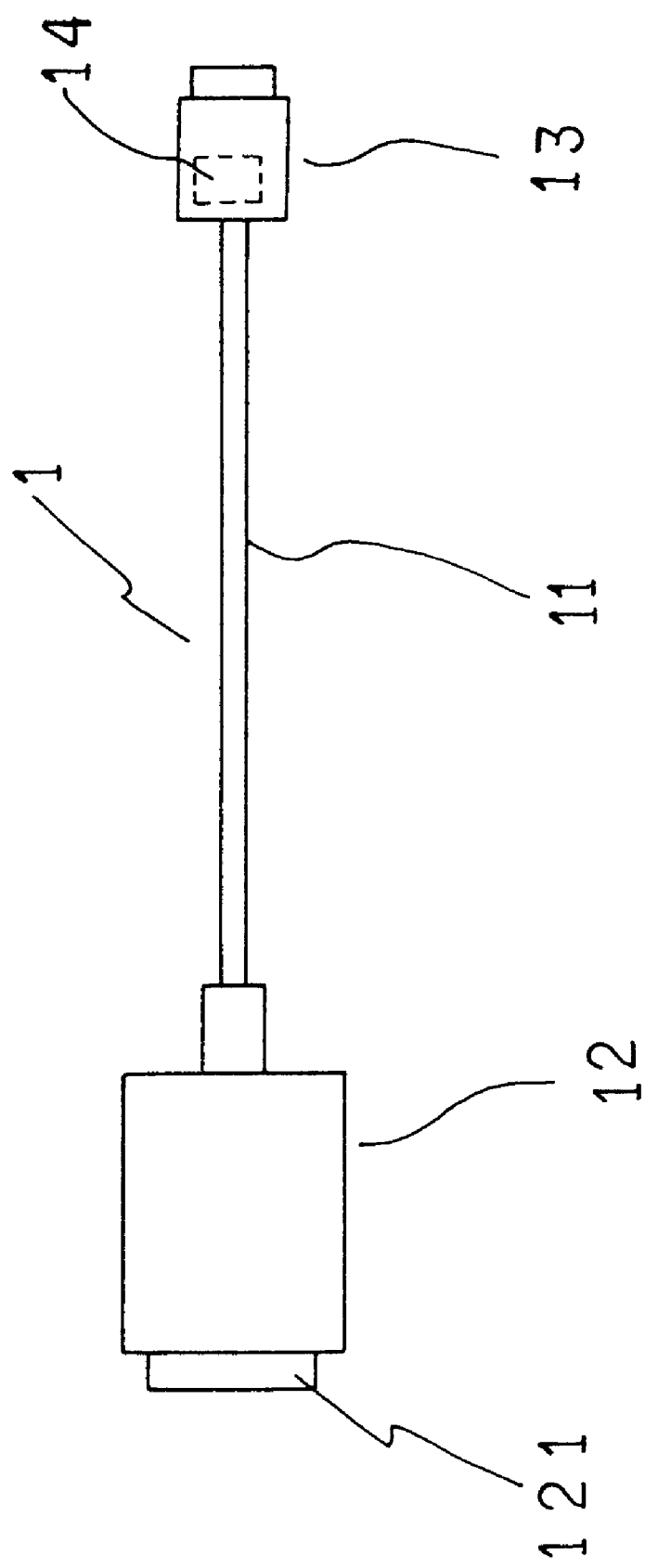
FIG. 6 shows. another connecting plug of the signal cable of the present invention internally equipped with a dial-decoding IC or circuitry.

A dial-decoding IC or circuitry 14 is housed in either the first connecting plug 12 registered with a cellular phone or in the second connecting plug 13 coupled to a hand-free system, as shown in FIGS. 5, 6. The dial-decoding IC or circuitry 14 in a signal cable can translate standard codes adopted by a sound-controlled or externally dialed hand-free system connected by the signal cable to a cellular phone, such as codes for 0, 1, 2, . . . 9, SEND, END and etc. into codes set according to a specific communication protocol for the cellular phone in operation. So, for each different type of cellular phone, a specific dial-decoding IC or circuitry is correspondingly provided. However, the codes generally adopted by a hand-free system is set by a standard communication protocol.

As described in the proceedings, in case the dial-decoding IC or circuitry 14 of the signal cable 1 is used in combination with a hand-free system 3, as shown in FIG. 2. The hand-free system 3 is comprised of a power and charging circuitry 31, amplifier and acoustic quality processing circuitry 32, an acoustic signal control circuitry 33, a sound identification circuitry 34, a sound identification input control 35, a microphone amplifying circuitry 37, a microphone 36 and a speaker 38.

Before one uses the hand-free system 3 to perform a phonic dial, setting must first be completed. In other words, the name or a company's title to be dialed to must be first input by means of a microphone 36, then the sound identification input control 35 is utilized to input a corresponding telephone number. In carrying out a phonic dial, a user reads out a name or a company's title via the microphone 36, which will be identified by the sound identification circuitry 34 in match with a pre-input phone number. Then, the number is delivered to the dial-decoding IC or circuitry 14 to be translated into codes specifically adapted for one particular type of cellular phone for dialing operation. So, for each type of a cellular phone, a specific signal cable 1 is equipped. To solve this problem, a dial-decoding IC or circuitry 14 can be housed together in the signal cable 1. So, the replacement of a signal cable 1 of such a kind means a substitute of a dial-decoding IC or circuitry 14 at the same time, making the hand-free system universally applicable to any types of cellular phones.

Figure 4:
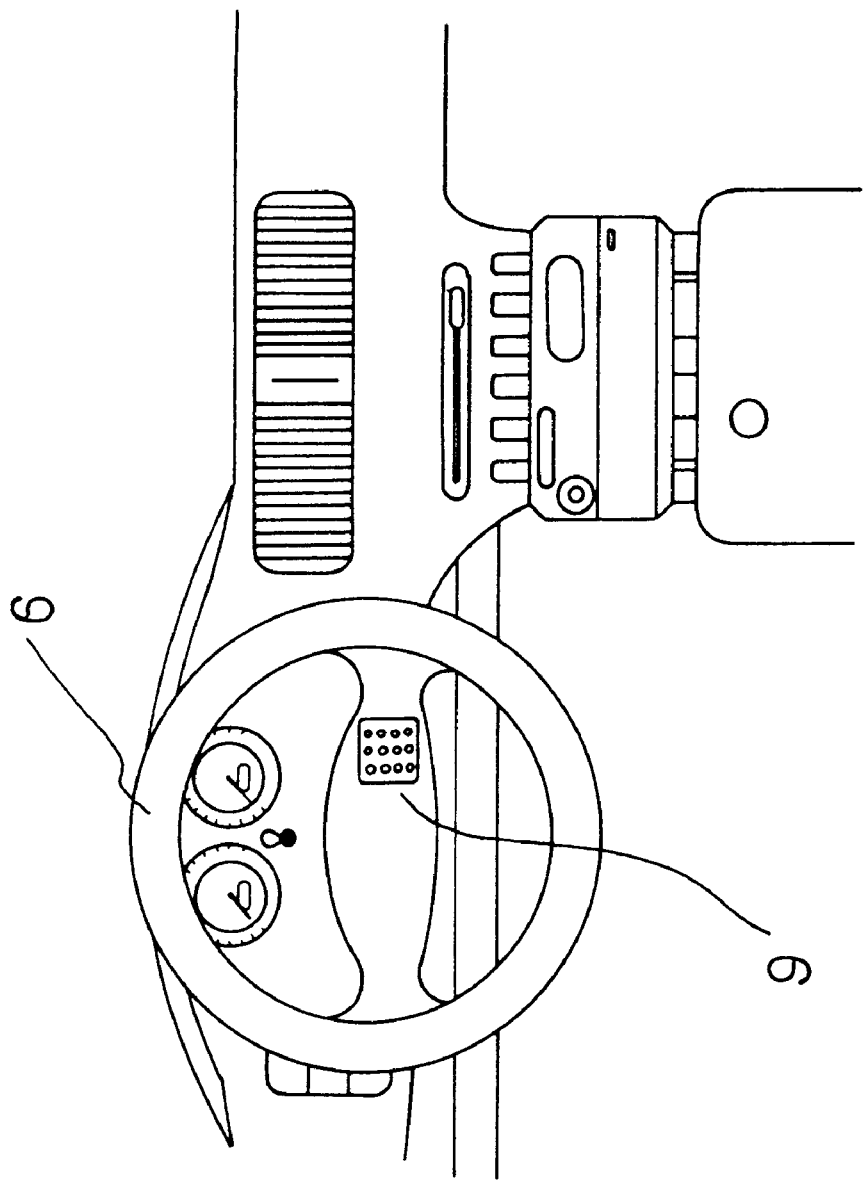
FIG. 4 shows an external dialing means in use in the present invention.

Referring to FIGS. 3, 4, it illustrates a signal cable 1 having a dial-decoding IC or circuitry 14 of the present invention in combination with an externally-dialed hand-free system and an external dialing keyboard. When a user dials with a dialing keyboard 9 secured to a steering wheel 6, the dial-decoding IC or circuitry 14 carries out the translation of the dialed number of the cellular phone 2 into codes according to the standard communication protocol codes 39 for cellular phones 2, such as codes for 0, 1, 2, . . . 9, SEND, END etc. Therefore, one type of cellular phone is equipped with its own specific signal cable 1. So, the installation of a dial-decoding IC or circuitry 14 on a signal cable 1 makes the replacement of the signal cable 1 similar to a substitute of the dial-decoding IC or circuitry 14 at the same time. Accordingly, such a signal cable structure permits a hand-free system universally applicable to all types of cellular phones.

Figure 7:
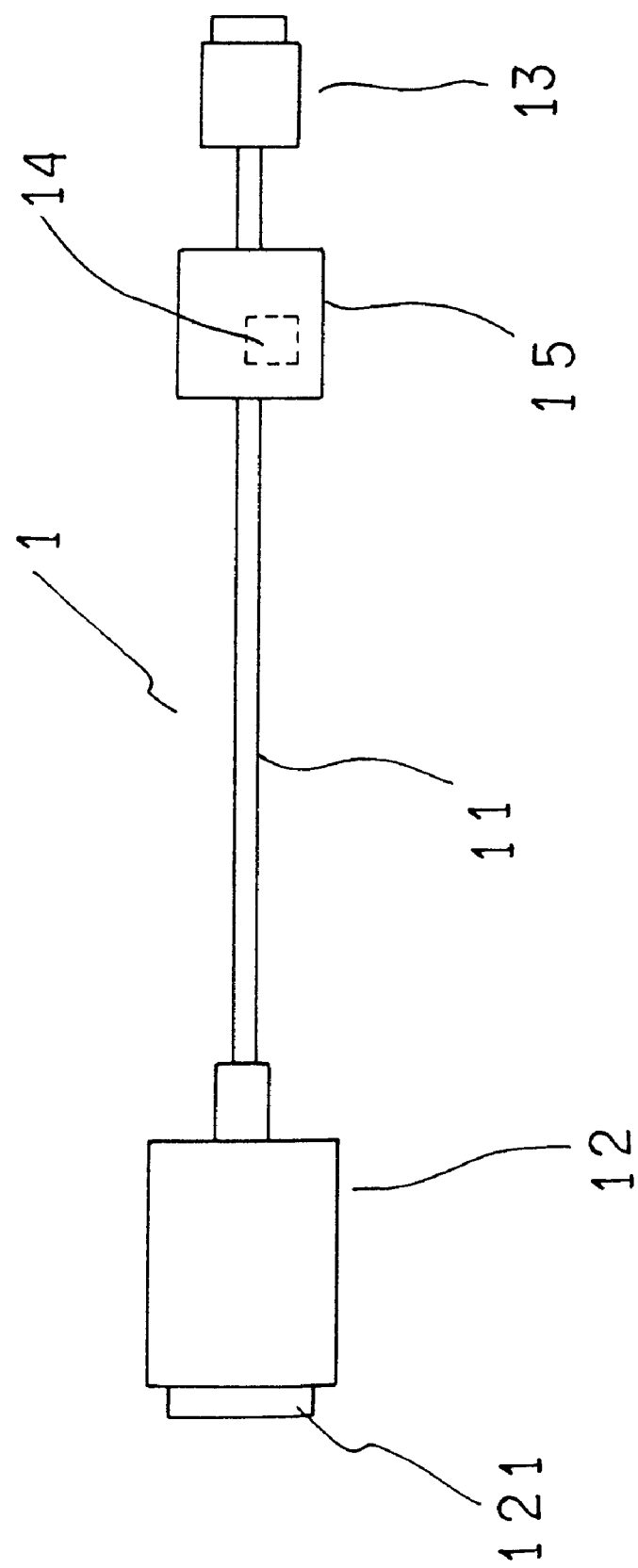
FIG. 7 shows a receiving box disposed between two connecting plugs of the signal cable of the present invention.

Referring to FIG. 7, if space in the first connecting plug 12 connected to a cellular phone or the second connecting plug 13 coupled to a hand-free system is too small to accommodate a dial-decoding IC or circuitry 14 and its associated circuits, a receiving box 15 for housing the dial-decoding IC or circuitry is alternatively placed between the first connecting plug 12 and the second connecting plug 13. This is another embodiment of the present invention.

Figure 8:
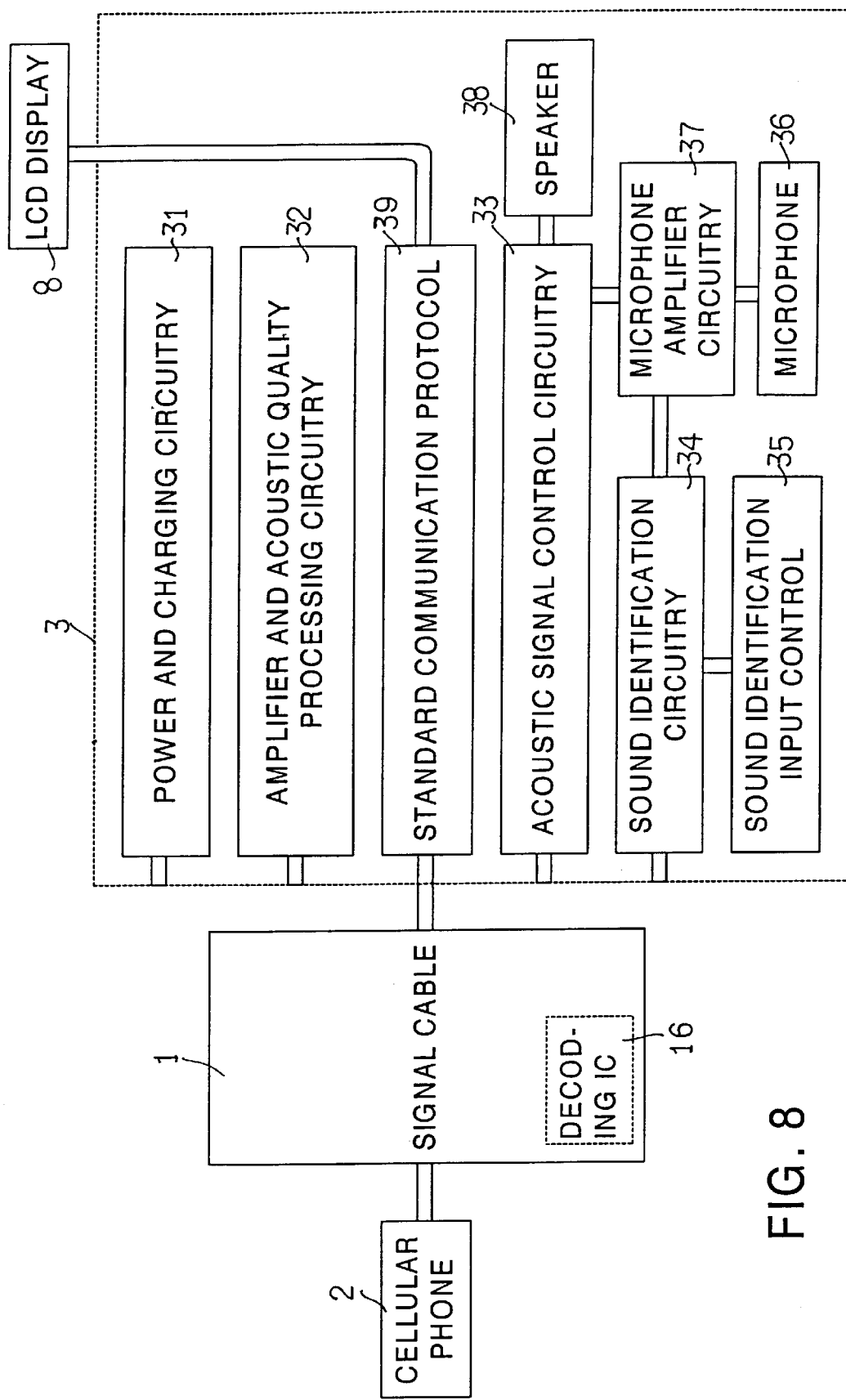
FIG. 8 is a diagram showing the present invention in combination with a vehicle's audio stereo system to display messages.

Referring to FIG. 8, one further embodiment of the present invention is illustrated. In all current types of cellular phones, a display screen to show the incoming phone numbers and various kinds of messages is indispensably equipped. However, when a hand-free system is used in a vehicle, a cellular phone is usually placed in a hidden place without clear sight. So, no messages can be viewed. To tackle this problem, a cellular phone 2 can be combined with a vehicle's audio stereo system so as to permit incoming phone numbers to be displayed on LCD display screen 8 or broadcast by way of sound. Now the problem is that most cellular phone systems adopt different communication protocols, it makes universal application of a hand-free system impossible.

To find a resolution to this problem, a decoding IC or circuitry 16 is integrally housed in a signal cable 1, which is compatible for some types of cellular phones to the proceeding dial-decoding IC or circuitry 14. It operates on the same principle. In other words, the codes defined by a specific communication protocol of the message or incoming phone numbers shown on a display screen of a vehicle's audio stereo system is set as a standard pattern, then a specific decoding IC or circuitry 16 is designed for each type of cellular phone 2 operated on codes set by different communication protocols whereby codes for 0, 1, 2, . . . SEND, END and etc. of the cellular phone 2 are translated into codes of the set standard patterns. Accordingly, by means of standard communication protocol codes 39, messages are displayed on a LCD screen 8 of a vehicle's audio stereo system or broadcast by means of sound. So, each cellular phone 2 is equipped with a specific signal cable 1 for universal connection to a common a hand-free system. Therefore, a decoding IC or circuitry 16 is directly housed in a signal cable 1 in production so as to permit a decoding IC or circuitry 16 to be accordingly replaced when a signal cable 1 is substituted, making universal application of a hand-free system to all cellular phones possible.

In summary, the signal cable of the present invention houses a dial-decoding IC or circuitry to convert the codes of a standard communication protocol for a hand-free system, such as codes standing for 0, 1, 2, . . . 9, SEND, END etc., into codes compatible with codes of cellular phones of various types produced based on different communication protocols. Thereby, simple replacement of a signal cable makes a hand-free system universally adapted to all types of cellular phones, making the production cost of hand-free systems lower in one aspect and also saving money for consumers to in purchase of hand-free systems in another aspect.

What is claimed is:

1. A plurality of replaceable signal cables wherein one replaceable signal cable is selected for detachably connecting a hands-free system having a first communication protocol to a cellular telephone having a second communication protocol, said selected replaceable signal cable comprising:

(a) a cable portion having first and second connection plugs and a flexible cord extending therebetween, said first connecting plug being configured for coupling to a signal output socket of the cellular telephone, said second connecting plug being configured for coupling to the hands-free system; and, (b) an interface portion disposed within said cable portion, said interface portion including a decoding circuit operable to convert between the first communication protocol of the hands-free system and the second communication protocol of the cellular telephone type; whereby the plurality of replaceable signal cables are adapted for providing bidirectional communication with a cellular telephone of any of a plurality of cellular telephone types.

2. The plurality of replaceable signal cables as recited in claim 1 wherein said cable portion includes a housing box intermediately coupled to said flexible cord, said housing box housing said interface portion.

3. The plurality of replaceable signal cables as recited in claim 1 wherein said decoding circuit is operable to convert communication signals from the cellular telephone for display of messages responsive thereto on a display of the hands-free system.

4. A hands-free cellular telephone system comprising:

(a) a hands-free unit having an output for communication with a cellular telephone using a predetermined communication protocol;

(b) a cellular telephone unit of a type selected from any of a plurality of cellular telephone types, each of said plurality of cellular telephone types having a respective one of a multiplicity of communication protocols, said multiplicity of communication protocols being different from said predetermined communication protocol of said hands-free unit; and, (c) a replaceable signal cable corresponding to said selected cellular telephone type detachably coupled to extend between said cellular telephone and said output of said hands-free unit, said signal cable including:

(1) a cable portion having first and second connection plugs and a flexible cord extending therebetween, said first and second connecting plugs being respectively configured for coupling to a signal output socket of said cellular telephone unit and said output of said hands-free unit; and, (2) an interface portion disposed within said cable portion, said interface portion including a decoding circuit operable to convert between said respective one communication protocol of said selected cellular telephone and said predetermined communication protocol of said hands-free unit;

whereby said hands-free unit is universally adaptable for bidirectional communication with a cellular telephone unit having any one of said multiplicity of communications protocols.

5. The hands-free cellular telephone system as recited in claim 4 herein said cable portion of said signal cable includes a housing box intermediately coupled to said flexible cord, said housing box housing said interface portion.

6. The hands-free cellular telephone system as recited in claim 4 wherein said hands-free unit includes a display device, said decoding circuit being operable to convert communication signals from said cellular telephone unit for corresponding display by said display device.

7. The hands-free cellular telephone system as recited in claim 4 Wherein said hands-free unit includes sound-controlled device.

8. The hands-free cellular telephone system as recited in claim 4 wherein said hands-free unit includes an external dialing device.

9. The hands-free cellular telephone system as recited in claim 4 herein said decoding device is operable to convert between respective alphanumeric communication codes of said cellular telephone and hands-free units.

* * * * *